United States Patent
Bell

(10) Patent No.: US 9,267,604 B2
(45) Date of Patent: Feb. 23, 2016

(54) VALVE SEAT APPARATUS FOR USE WITH FLUID VALVES

(71) Applicant: Fisher Controls International LLC, Marshalltown, IA (US)

(72) Inventor: Brandon Wayne Bell, Marshalltown, IA (US)

(73) Assignee: Fisher Controls International LLC, Marshalltown, IA (US)

(*) Notice: Subject to any disclaimer, the term of this patent is extended or adjusted under 35 U.S.C. 154(b) by 266 days.

(21) Appl. No.: 13/828,539

(22) Filed: Mar. 14, 2013

(65) Prior Publication Data
US 2014/0264135 A1    Sep. 18, 2014

(51) Int. Cl.
F16K 1/42 (2006.01)
F16K 47/08 (2006.01)
F16K 3/24 (2006.01)

(52) U.S. Cl.
CPC . F16K 1/42 (2013.01); F16K 3/246 (2013.01); F16K 47/08 (2013.01)

(58) Field of Classification Search
CPC ............ F16K 1/42; F16K 3/246; F16K 47/08
USPC .......................... 137/625.28–625.38; 251/328
See application file for complete search history.

(56) References Cited

U.S. PATENT DOCUMENTS

| | | |
|---|---|---|
| 1,331,305 A | 2/1920 | Wilkinson |
| 1,465,349 A | 8/1923 | Cunningham et al. |
| 1,595,246 A | 8/1926 | Ragsdale |
| 2,192,339 A | 3/1940 | Wilson |
| 2,397,574 A | 4/1946 | Thonet |
| 4,130,285 A | 12/1978 | Whitaker |

(Continued)

FOREIGN PATENT DOCUMENTS

| | | |
|---|---|---|
| CN | 202418891 | 9/2012 |
| GB | 1561159 | 2/1980 |

(Continued)

OTHER PUBLICATIONS

International Searching Authority, "Invitation to Pay Additional Fees and, Where Applicable, Protest Fee," issued in connection with corresponding international patent application No. PCT/US2014/022255, mailed on Jul. 10, 2014, 4 pages.

(Continued)

*Primary Examiner* — Craig Schneider
*Assistant Examiner* — Frederick D Soski
(74) *Attorney, Agent, or Firm* — Hanley, Flight & Zimmerman, LLC

(57) ABSTRACT

A valve seat apparatus for use with fluid valves is described herein. An example valve seat apparatus includes a seat ring having a central passage therethrough and an outer wall. The outer wall comprises a threaded portion, having a first diameter, to engage a cage of a fluid valve. The outer wall also includes a sealing portion to capture a seal assembly between the sealing portion and a surface of a body of the fluid valve. The sealing portion has a second diameter greater than the first diameter. The outer wall of the example valve seat apparatus further includes a flange portion to capture the seal assembly between the cage and the flange portion. The flange portion extends toward the surface of the body and the sealing portion is to be positioned between the flange portion and the threaded portion. The flange portion has a third diameter greater than the second diameter.

19 Claims, 7 Drawing Sheets

(56) References Cited

U.S. PATENT DOCUMENTS

| | | | |
|---|---|---|---|
| 4,834,133 | A | 5/1989 | LaCoste et al. |
| 5,056,757 | A | 10/1991 | Wood |
| 5,129,625 | A | 7/1992 | Wood et al. |
| 5,247,960 | A | 9/1993 | Kornfeldt et al. |
| 6,637,452 | B1 | 10/2003 | Alman |
| 6,641,112 | B2 | 11/2003 | Antoff et al. |
| 6,840,520 | B2 | 1/2005 | Faas et al. |
| 7,854,239 | B2 | 12/2010 | Wears et al. |
| 2002/0017327 | A1 | 2/2002 | Kawaai et al. |
| 2003/0116920 | A1 | 6/2003 | Friend et al. |
| 2003/0159737 | A1 | 8/2003 | Stares |
| 2003/0226600 | A1* | 12/2003 | Stares et al. .............. 137/625.3 |
| 2004/0145120 | A1 | 7/2004 | Faas et al. |
| 2006/0048826 | A1 | 3/2006 | Gossett et al. |
| 2006/0207666 | A1 | 9/2006 | Micheel et al. |
| 2008/0012324 | A1 | 1/2008 | Dole et al. |
| 2008/0264504 | A1 | 10/2008 | Gossett et al. |
| 2009/0020720 | A1 | 1/2009 | Davies, Jr. et al. |
| 2009/0127488 | A1 | 5/2009 | McCarty et al. |
| 2009/0218536 | A1 | 9/2009 | Wears et al. |
| 2010/0044613 | A1 | 2/2010 | Gossett et al. |
| 2010/0288954 | A1 | 11/2010 | Czimmek et al. |
| 2010/0301240 | A1* | 12/2010 | Bell et al. ................... 251/118 |
| 2010/0301253 | A1* | 12/2010 | Perrault et al. ............... 251/333 |
| 2011/0012046 | A1* | 1/2011 | Bell ............................ 251/359 |
| 2011/0179911 | A1 | 7/2011 | Whitehead |
| 2012/0319027 | A1 | 12/2012 | Dobbs et al. |

FOREIGN PATENT DOCUMENTS

| | | |
|---|---|---|
| GB | 2318315 | 4/1998 |
| JP | 2005147213 | 6/2005 |
| JP | 2009523968 | 6/2009 |
| TW | M439662 | 10/2012 |
| WO | 2007081640 | 7/2007 |
| WO | 2009012168 | 1/2009 |
| WO | 2009105405 | 8/2009 |
| WO | 2012012951 | 2/2012 |
| WO | WO 2012012951 A1 * | 2/2012 |

OTHER PUBLICATIONS

International Searching Authority, "International Search Report," issued in connection with corresponding International patent application No. PCT/US2014/022255, mailed on Nov. 4, 2014, 4 pages.

International Searching Authority, "Written Opinion of the International Searching Authority," issued in connection with corresponding International patent application No. PCT/US2014/022255, mailed on Nov. 4, 2014, 10 pages.

Japanese Patent Office, "Notice of Reasons for Refusal," issued in connection with Japanese Patent Application No. 2013-520943, with English translation, mailed Jun. 11, 2014, 8 pages.

Emerson Process Management, "Inverted Globe Valve Applications," Oct. 2001, 5 pages.

Emerson Process Management, "Fisher ED, EAS, and EDR Sliding-Stem Control Valves," Dec. 2012, 24 pages.

Emerson Process Management, "Designs FB and FBG Control Valves," Jan. 1993, 8 pages.

Emerson Process Management, "Design EUD, EUT-2, EWD, and EWT-2 Valves," Sep. 1993, 14 pages.

The State Intellectual Property Office of the People'S Republic of China, "The Second Office Action," issued in connection with Chinese Patent Application No. 201080068351.6, mailed on Nov. 15, 2014, 6 pages.

The United States Patent and Trademark Office, "Non-Final Office Action," issued in connection with U.S. Appl. No. 13/599,762, mailed on Jul. 26, 2013, 38 pages.

The United States Patent and Trademark Office, "Final Office Action," issued in connection with U.S. Appl. No. 13/599,762, mailed on Feb. 6, 2014, 34 pages.

The United States Patent and Trademark Office, "Advisory Action," issued in connection with U.S. Appl. No. 13/599,762, mailed on Apr. 28, 2014, 7 pages.

The United States Patent and Trademark Office, "Non-Final Office Action," issued in connection with U.S. Appl. No. 13/599,762, mailed on Sep. 12, 2014, 36 pages.

Notification of the First Office Action, issued by the State Intellectual Property Office of the P.R. China, in connection with Chinese Patent Application No. 201080068351.6, on Apr. 14, 2014, 25 pages.

Restriction and/or Election Requirement, issued by the United States Patent and Trademark Office in connection with U.S. Appl. No. 13/895,973, on Jan. 30, 2015, 5 pages.

International Search Report, issued by the International Searching Authority in connection with corresponding International patent application No. PCT/US2014/022251, mailed on Jul. 10, 2014, 2 pages.

International Written Opinion, issued by the International Searching Authority in connection with corresponding International patent application No. PCT/US2014/022251, mailed on Jul. 10, 2014, 6 pages.

International Search Report, issued by the International Searching Authority in connection with application No. PCT/CN2010/075607, on May 5, 2011, 5 pages.

Written Opinion of the International Searching Authority, issued by the International Searching Authority in connection with application No. PCT/CN2010/075607, on May 5, 2011, 5 pages.

Office Action, issued by the United States Patent and Trademark Office in connection with U.S. Appl. No. 13/895,973, on May 8, 2015, 7 pages.

Final Rejection, issued by the United States Patent and Trademark Office in connection with U.S. Appl. No. 13/599,762, on Mar. 5, 2015, 20 pages.

Office Action, issued by the United States Patent and Trademark Office in connection with U.S. Appl. No. 13/599,762, on Jul. 23, 2015, 14 pages.

Office Action, issued by the United States Patent and Trademark Office in connection with U.S. Appl. No. 13/895,973 dated Oct. 8, 2015, 7 pages.

International Preliminary Report on Patentability and Written Opinion, issued by the International Searching Authority in connection with International patent application No. PCT/US2014/022251, mailed on Sep. 15, 2015, 7 pages.

International Preliminary Report on Patentability and Written Opinion, issued by the International Searching Authority in connection with International patent application No. PCT/US2014/022255, mailed on Sep. 15, 2015, 12 pages.

Notice of Allowance, issued by the United States Patent and Trademark Office in connection with U.S. Appl. No. 13/895,973, Nov. 20, 2015, 15 pages.

Notice of Allowance, issued by the United States Patent and Trademark Office in connection with U.S. Appl. No. 13/599,762, Nov. 25, 2015, 12 pages.

* cited by examiner

VALVE SEAT APPARATUS FOR USE WITH FLUID VALVES

FIELD OF THE DISCLOSURE

This disclosure relates generally to valves and, more particularly, to valve seat apparatus for use with fluid valves.

BACKGROUND

Valves are commonly used in process control systems to control the flow of process fluids. Sliding stem valves (e.g., a gate valve, a globe valve, a diaphragm valve, a pinch valve, etc.) typically have a closure member (e.g., a valve plug) disposed in a fluid path. A valve stem operatively couples the closure member to an actuator to move the closure member between an open position and a closed position to allow or restrict fluid flow between an inlet and an outlet of the valve. Additionally, to provide desired and/or to achieve certain flow characteristics of the fluid, valves often employ a cage interposed within the path of fluid flow between the inlet and the outlet of the valve. A cage may be used to reduce capacity flow, attenuate noise and/or reduce or eliminate cavitation.

Typically, the size of the valve and the industrial process conditions such as, operational temperatures (e.g., temperatures between −100° F. and 450° F., temperatures greater than 450° F., etc.) of the process fluids, are used to determine the type of valve and/or valve components that may be used such as, for example, the types of seals that may be used to effect a seal between a cage, a valve seat, a valve body and/or a closure member. Further, the type of seals that are used usually determines the valve seat/seal configuration. For example, to provide a seal between a valve seat and a valve body, a seal composed of, for example, polytetrafluoroethylene (e.g., PTFE or Teflon®) is typically disposed between the valve seat and the valve body for use with process fluids having temperatures less than 450° F.

In some known valves, the seal may be disposed within an annular recess formed around an outer peripheral surface of the valve seat. The valve seat is coupled to a cage (e.g., via threads), which suspends the valve seat within a fluid flow path of the valve body when the cage is coupled to the valve body. The seal prevents fluid leakage between the valve body and the valve seat. However, process fluids having temperatures greater than 450° F. may cause a seal (e.g., a flexible seal) composed of polytetrafluoroethylene to extrude or fail. For process fluids having temperatures greater than 450° F., a valve seat/seal configuration may include a gasket disposed between the valve seat and the valve body. However, such a valve seat/seal configuration requires the valve seat to be fastened (e.g., bolted) to the valve body. Thus, a valve seat/seal configuration of a valve for use with process temperatures greater than 450° F. uses a valve body that is different than a body of a valve having a valve seat/seal configuration for use with process fluid having temperatures less than 450° F.

SUMMARY

An example valve seat apparatus described herein includes a seat ring having a central passage therethrough and an outer wall. The outer wall of the example valve seat includes a threaded portion to engage a cage of a fluid valve, the threaded portion having a first diameter, and a sealing portion to capture a seal assembly between the sealing portion and a surface of a body of the fluid valve. The sealing portion has a second diameter greater than the first diameter. The outer wall of the example valve seat further includes a flange portion to capture the seal assembly between the cage and the flange portion, the flange portion to extend toward the surface of the body and the sealing portion to be positioned between the flange portion and the threaded portion, the flange portion having a third diameter greater than the second diameter.

In another example, an example apparatus comprises a fluid valve having a body and a cage disposed in the body. The example apparatus also includes a valve seat coupled to the cage and shaped to form a seal gland, two walls of the seal gland formed by the valve seat, one wall of the seal gland formed by an end of the cage and another wall of the seal gland formed by the fluid valve body.

Another example apparatus described herein includes a fluid valve body defining a passageway between an inlet and an outlet, a cage disposed within the passageway and a valve seat having an outer wall forming a means for holding a seal assembly with the cage and the valve body.

DETAILED DESCRIPTION

Figure 1:
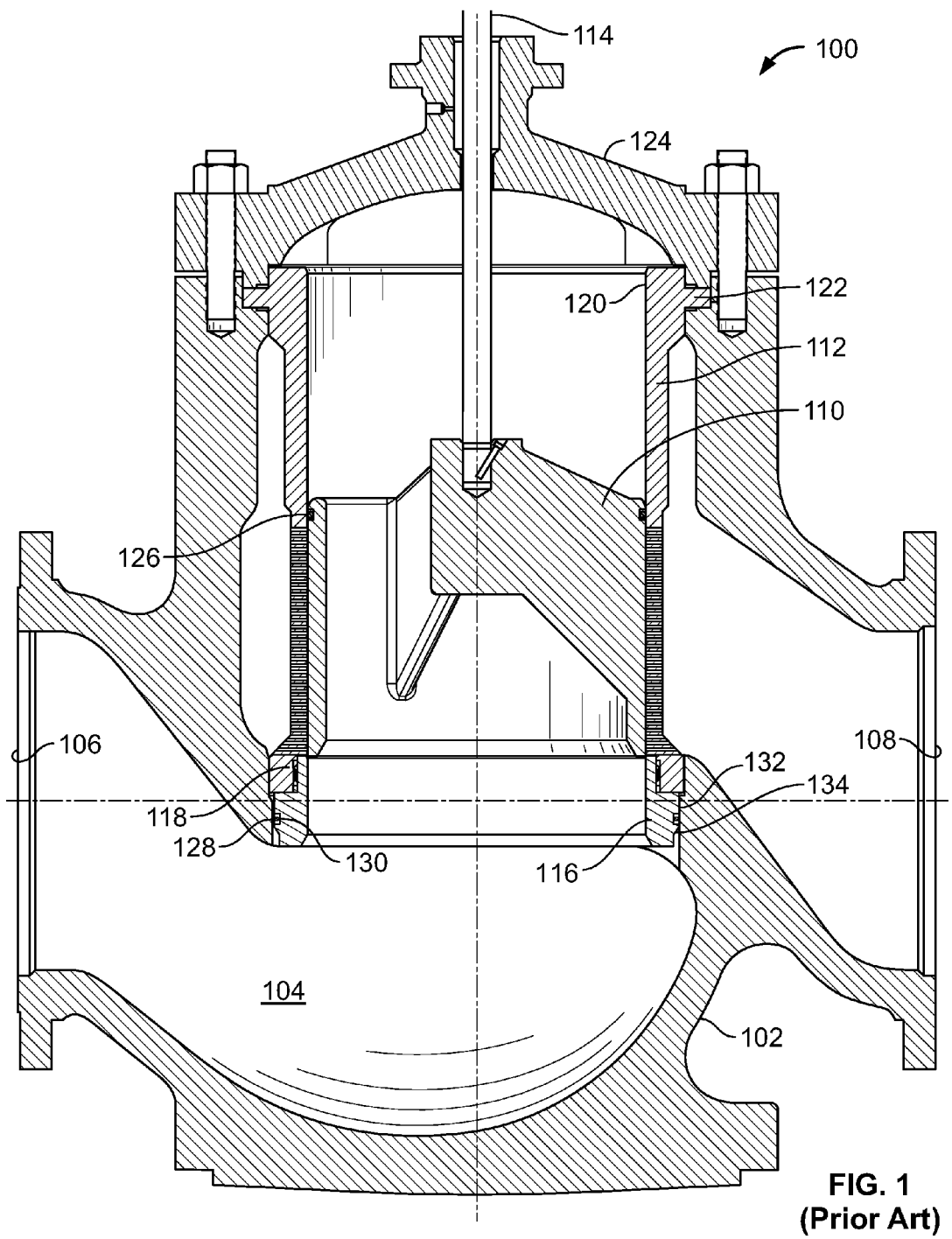
FIG. 1 is a cross-sectional view of a known valve implemented with a known sealing assembly.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example valve seat apparatus described herein enables different seal assemblies to be used with a given fluid valve body to enable the valve to be used in different operating temperature ranges. In this manner, the example valve seat apparatus enable the use of different types of seal assemblies without the need to alter additional valve components (e.g., the cage, the valve seat, the valve body, etc.).

The example valve seat apparatus described herein may be used with valves having a sliding stem such as, for example, control valves, throttling valves, etc. In some examples, the valve seat apparatus is coupled to a cage, which suspends the valve seat and the seal assembly within a valve body when the cage is coupled to the valve body. The example valve seat apparatus described herein provide a modular valve seat that enables interchangeability between different types of sealing assemblies for use with process fluids of widely varying temperatures (e.g., −325° F. to 1100° F.). As a result of the interchangeability provided by the valve seat apparatus described herein, fewer total components are needed to provide a greater variety of seal configurations for fluid valves that can be used with a wide range of process fluid temperatures. In other words, with the example valve seat apparatus described herein, it is not necessary to manufacture and inventory each possible combination of valve seat configuration, cage configuration and/or valve body configuration as is typically required with known valve seat designs. Therefore, the valve seat apparatus described herein enables manufacturing of a single valve body that can receive the valve seat apparatus when used with the different sealing assemblies or configurations.

More specifically, the valve seat apparatus described herein may receive a first seal assembly for use with process fluids having a first temperature range, for example, between about −100° F. or lower and 450° F., a second seal assembly for use with process fluids having a second temperature range, for example, between about 450° F. and 600° F., or a third seal assembly for use with process fluids having a third temperature range, for example, between about 600° F. and 1100° F., or higher. For example, the first seal assembly may include a polytetrafluoroethylene (PTFE) or ultra high molecular weight polyethylene seal, the second seal assembly may include a PTFE seal and an anti-extrusion ring, and the third seal assembly may include a bore seal (e.g., a metal seal such as a C-seal). The example valve seat apparatus described herein are capable of accommodating soft seals (e.g., flexible seals) such as, for example, PTFE or ultra high molecular weight polyethylene seals and stiffer non-deformable seals such as, for example, metal seals during high temperature operations. Further, the example valve seat apparatus described herein do not require a separate seal retainer to retain the seal assemblies and, thus, require less manufacturing and maintenance costs. A description of a valve seat capable of accommodating different seal assemblies by use of a seal retainer may be found in U.S. patent application Ser. No. 13/599,762, titled "VALVE SEAT APPARATUS FOR USE WITH FLUID VALVES," which is hereby incorporated by reference in its entirety.

Before discussing the example valve seat apparatus in detail, a brief description of a known fluid valve 100 is provided below in connection with FIG. 1. The fluid valve 100 illustrated in FIG. 1 includes a valve body 102 that defines a fluid flow passageway 104 between an inlet 106 and an outlet 108. A valve plug 110 is slidably disposed within a cage 112 and moves between an open position and a closed position to control the fluid flow through the fluid valve 100. A valve stem 114 couples the valve plug 110 to an actuator (not shown), which moves the valve plug 110 toward and away from a valve seat 116. The valve seat 116 is coupled to a first end 118 of the cage 112 (e.g., via threads) and a second end 120 of the cage 112 includes a flange 122 disposed between the valve body 102 and a bonnet 124. When coupled to the valve body 102, the cage 112 suspends or retains the valve seat 116 within the valve body 102.

In operation, an actuator moves the valve plug 110 away from the valve seat 116 to allow fluid flow through the fluid valve 100 (e.g., the open position) and toward the valve seat 116 to restrict fluid flow through the fluid valve 100. The valve plug 110 sealingly engages the valve seat 116 to prevent fluid flow through the fluid valve 100 (e.g., the closed position). A plug seal assembly 126 prevents fluid leakage between the valve plug 110 and the cage 112 when the fluid valve 100 is in the closed position (i.e., when the valve plug 110 sealingly engages the valve seat 116) as shown in FIG. 1.

A seal 128 composed of an elastomeric material such as a polytetrafluoroethylene is disposed within a channel or annular recess 130 formed at an outer peripheral surface 132 of the valve seat 116. The valve seat 116 includes a tapered edge or surface 134 (e.g., a chamfered or lead-in surface or edge) to enable or facilitate assembly of the seal 128 with the valve seat 116. Thus, the seal 128 in this example is flexible to enable the seal 128 to be stretched over and outside of the surface 134 of the valve seat 116 and into the annular recess 130. The seal 128 (e.g., an O-ring) prevents fluid leakage between the valve seat 116 and the valve body 102. When the seal 128 is composed of a polytetrafluoroethylene material, the example fluid valve 100 of FIG. 1 may be used with process fluids having temperatures between about −100° F. and 450° F. Process fluids having temperatures greater than 450° F. may cause the seal 128 to extrude and/or disintegrate.

Figure 2A:
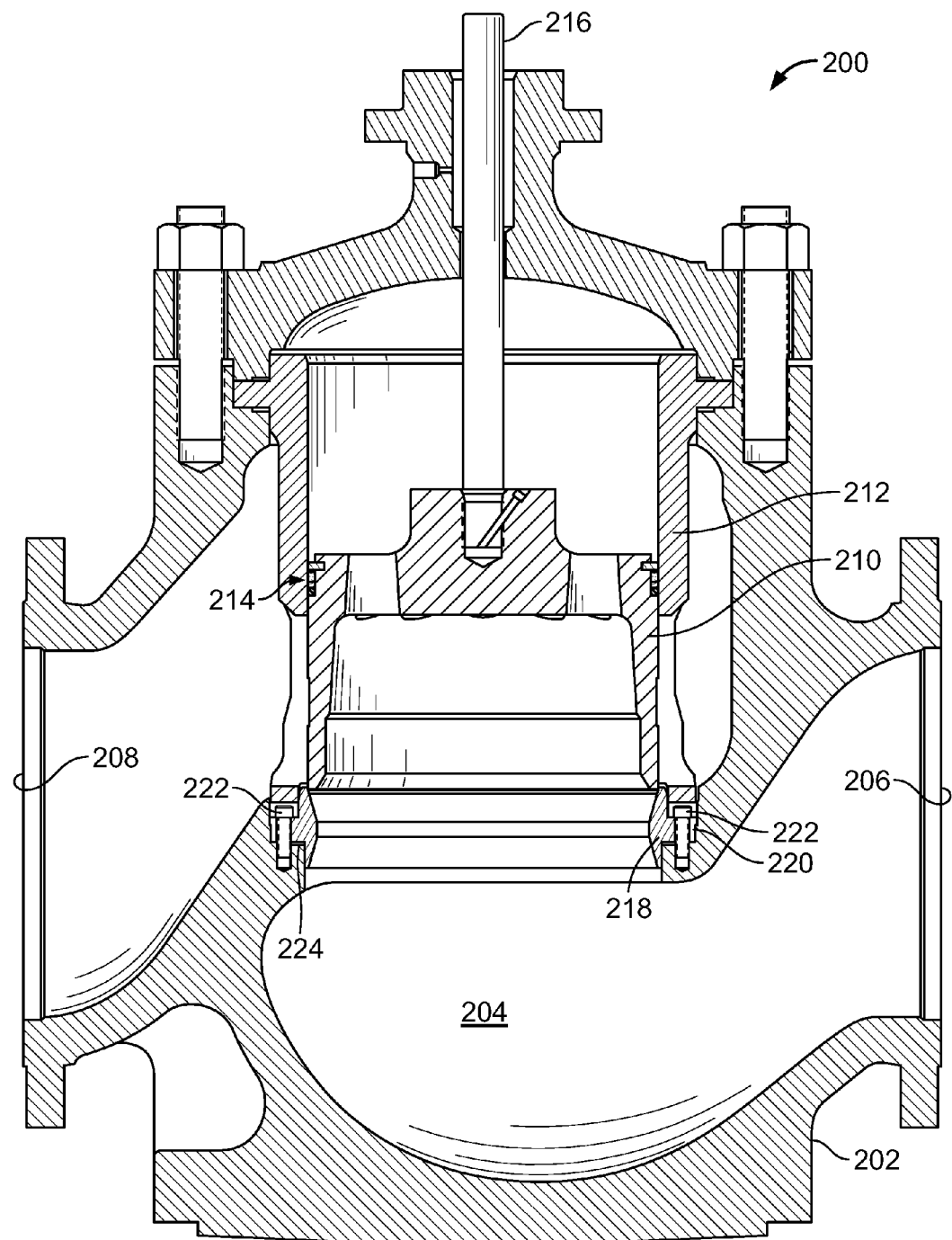
FIG. 2A is a cross-sectional view of another known valve implemented with another known sealing assembly.

FIG. 2A illustrates another known valve 200 that may be used with process fluids having temperatures between about 450° F. and 600° F. The fluid valve 200 illustrated in FIG. 2A includes a valve body 202 that defines a fluid flow passageway 204 between an inlet 206 and an outlet 208. A valve plug 210 is slidably disposed within a cage 212 and moves between an open position and a closed position to control the fluid flow through the fluid valve 200. The valve plug 210 includes a seal assembly 214 to provide a seal between the valve plug 210 and the cage 212. A valve stem 216 couples the valve plug 210 to an actuator (not shown), which moves the valve plug 210 toward and away from a valve seat 218. The valve seat 218 includes a flange 220 (e.g., an annular flange) that receives a plurality of fasteners 222 (e.g., bolts) to couple the valve seat 218 to the valve body 202. A gasket 224 is disposed between the valve seat 218 and the valve body 202 to reduce or prevent fluid leakage between the valve seat 218 and the valve body 202.

The valve seat 218 and valve body 202 configuration shown in FIG. 2A is typically used with process fluid having temperatures between about 450° F. and 600° F. In such a temperature range, a seal made of an elastomeric material (e.g., polytetrafluoroethylene) would not typically be used to provide a seal between the valve seat 218 and the valve body 202 because it may extrude or disintegrate due to the temperature of the process fluid. Additionally, in applications where process fluid temperatures are between −325° F. and −100° F., a seal made of an elastomeric material is not typically used to provide a seal between the valve seat 218 and the valve body 202 because the seal is too stiff (e.g., brittle, non-flexible). Also, the valve seat 218 and the valve body 202 of the fluid valve 200 are configured differently than the valve seat 116 and the valve body 102 of the fluid valve 100 of FIG. 1.

Figure 2B:
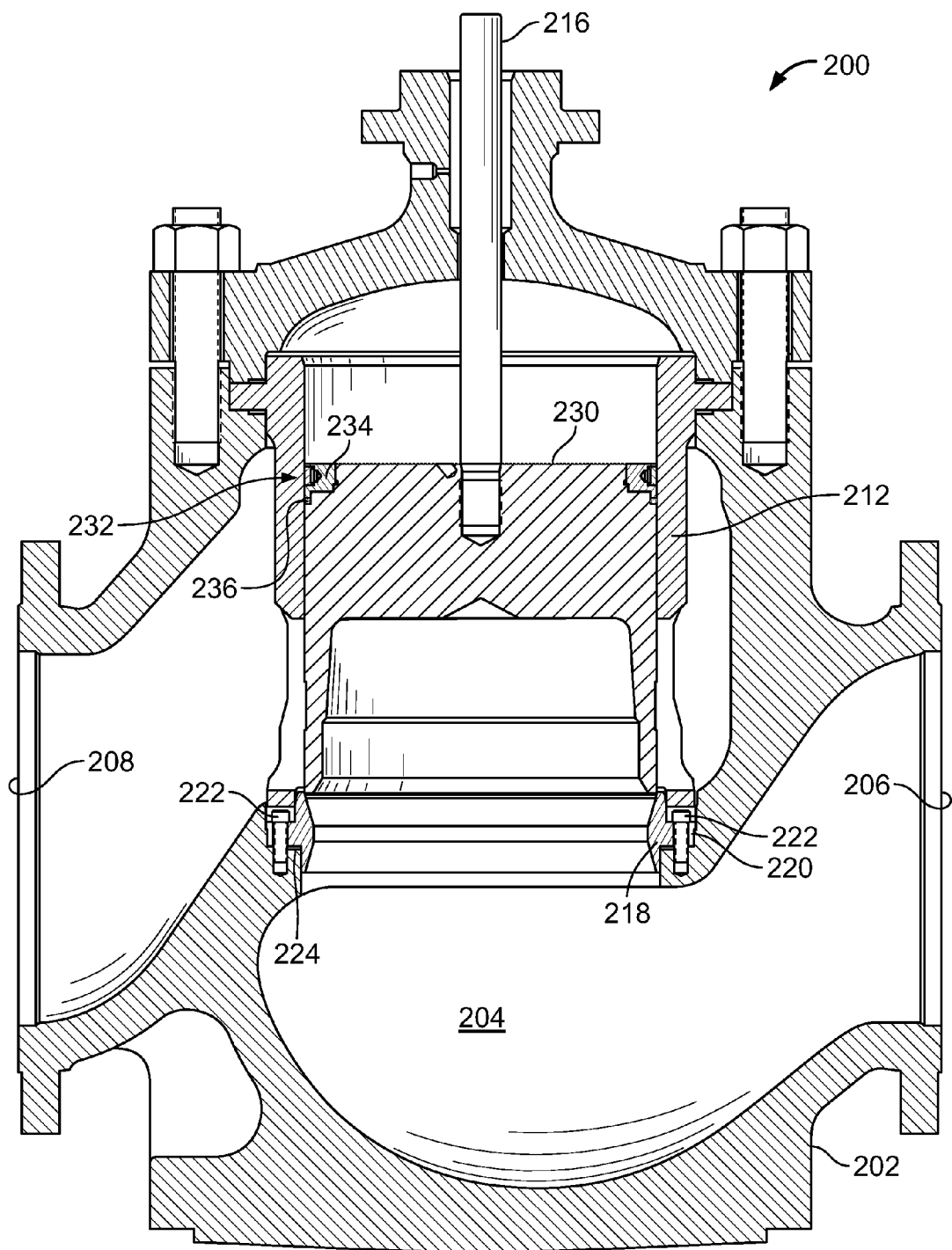
FIG. 2B is a cross-sectional view of another known valve implemented with another known sealing assembly.

FIG. 2B illustrates the valve 200 of FIG. 2A that is implemented with a closure member 230 having a seal assembly 232 for use with process fluids having a temperature range between about 600° F. and 1100° F. In this example, the seal assembly 232 of the closure member 230 includes a retainer 234 (to hold in a graphite piston ring) and a bore seal 236 (e.g., a C-shaped seal) that is made of metal or any other material to provide relatively high resistance to leakage of process fluid around or past the closure member 230 between the closure member 230 and the cage 212 (or the valve body 202) for process fluids having relatively high temperatures (e.g., temperatures greater than about 600° F.).

Thus, as a result, configurations using different valve body and valve seat configurations are needed to accommodate different process fluid temperature ranges, resulting in larger inventories and increased manufacturing costs.

Figure 3A:
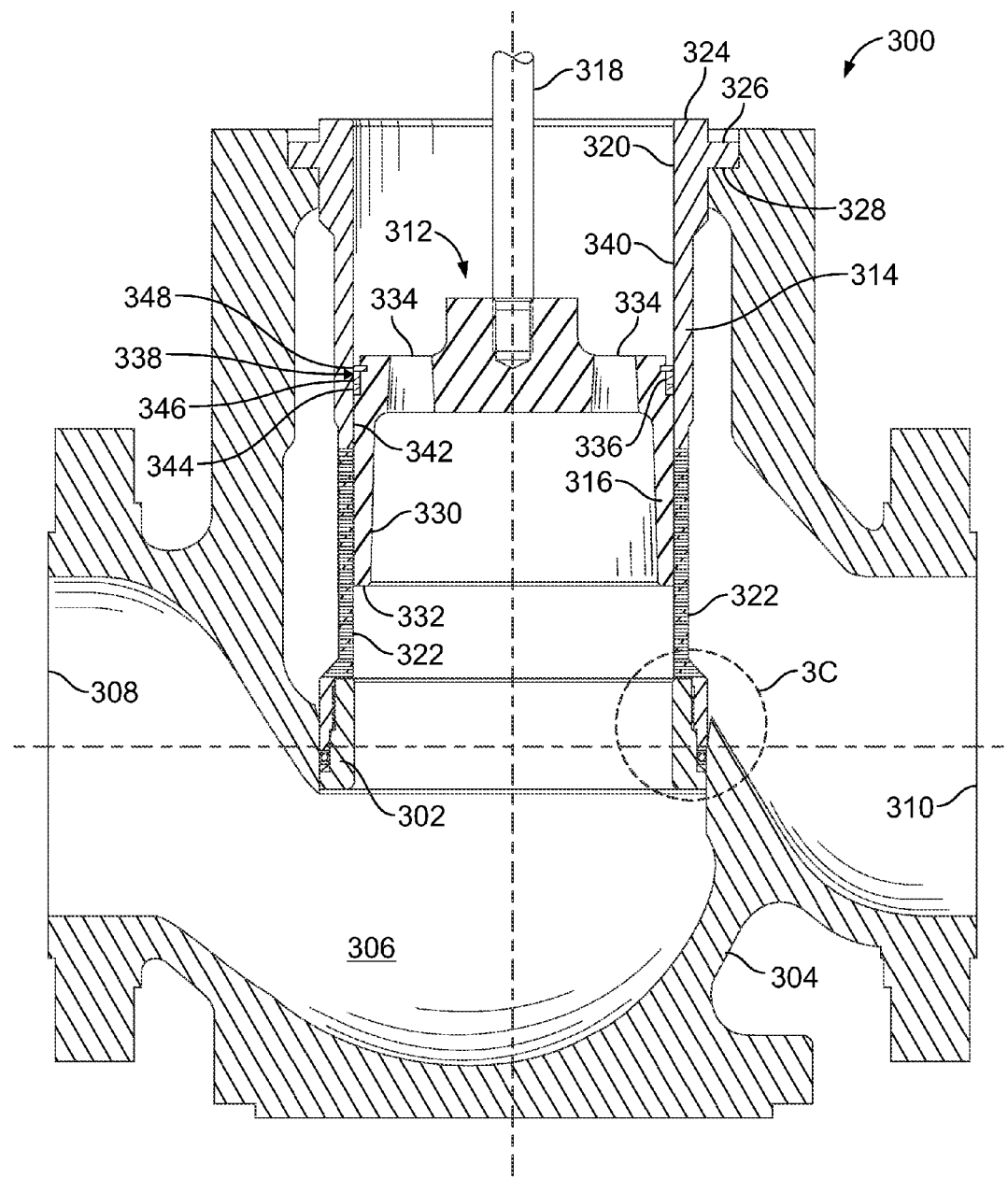
FIG. 3A is a cross-sectional view of a valve implemented with an example valve seat apparatus described herein.
Figure 3B:
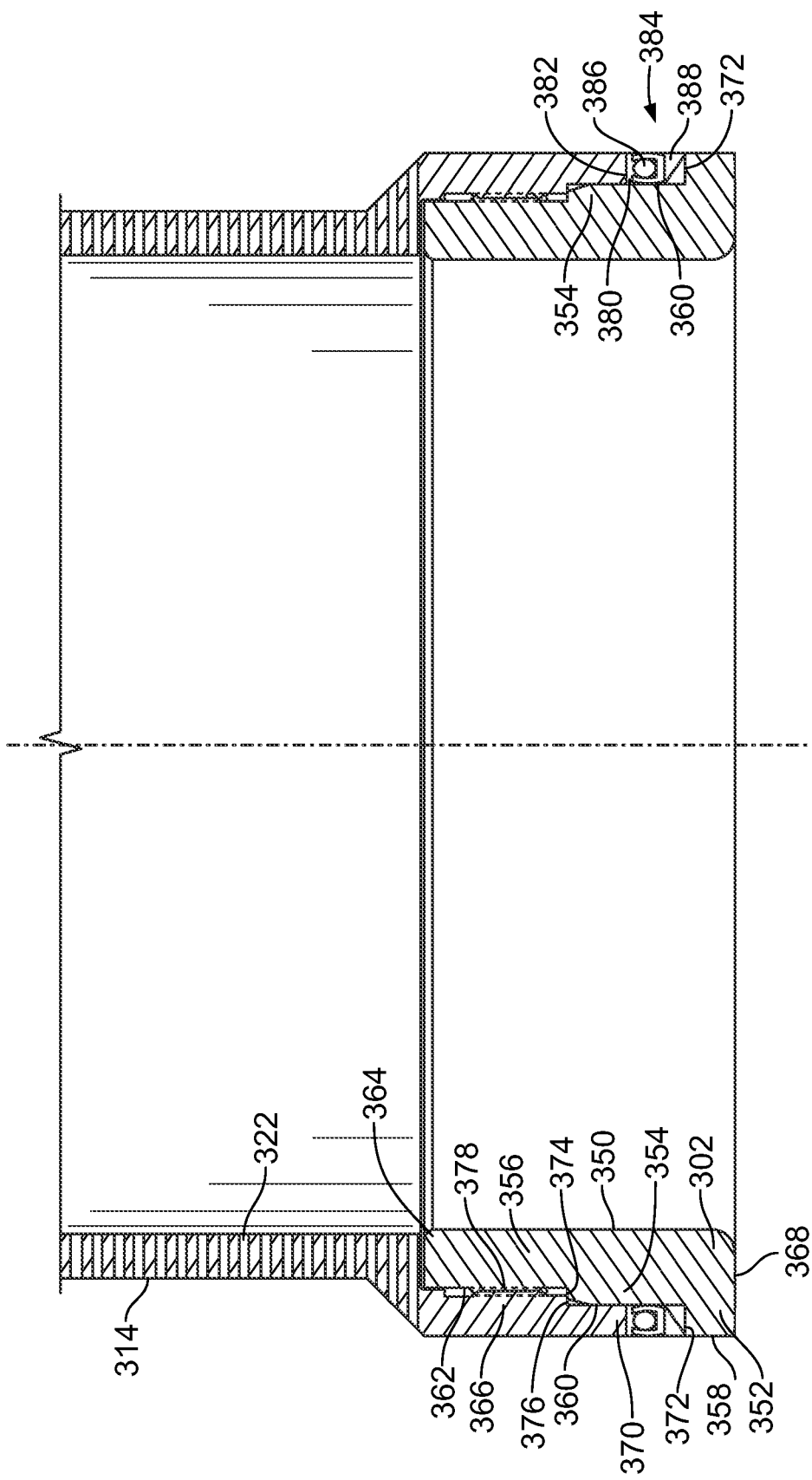
FIG. 3B is an enlarged view of the example valve seat apparatus of FIG. 3A.
Figure 3C:
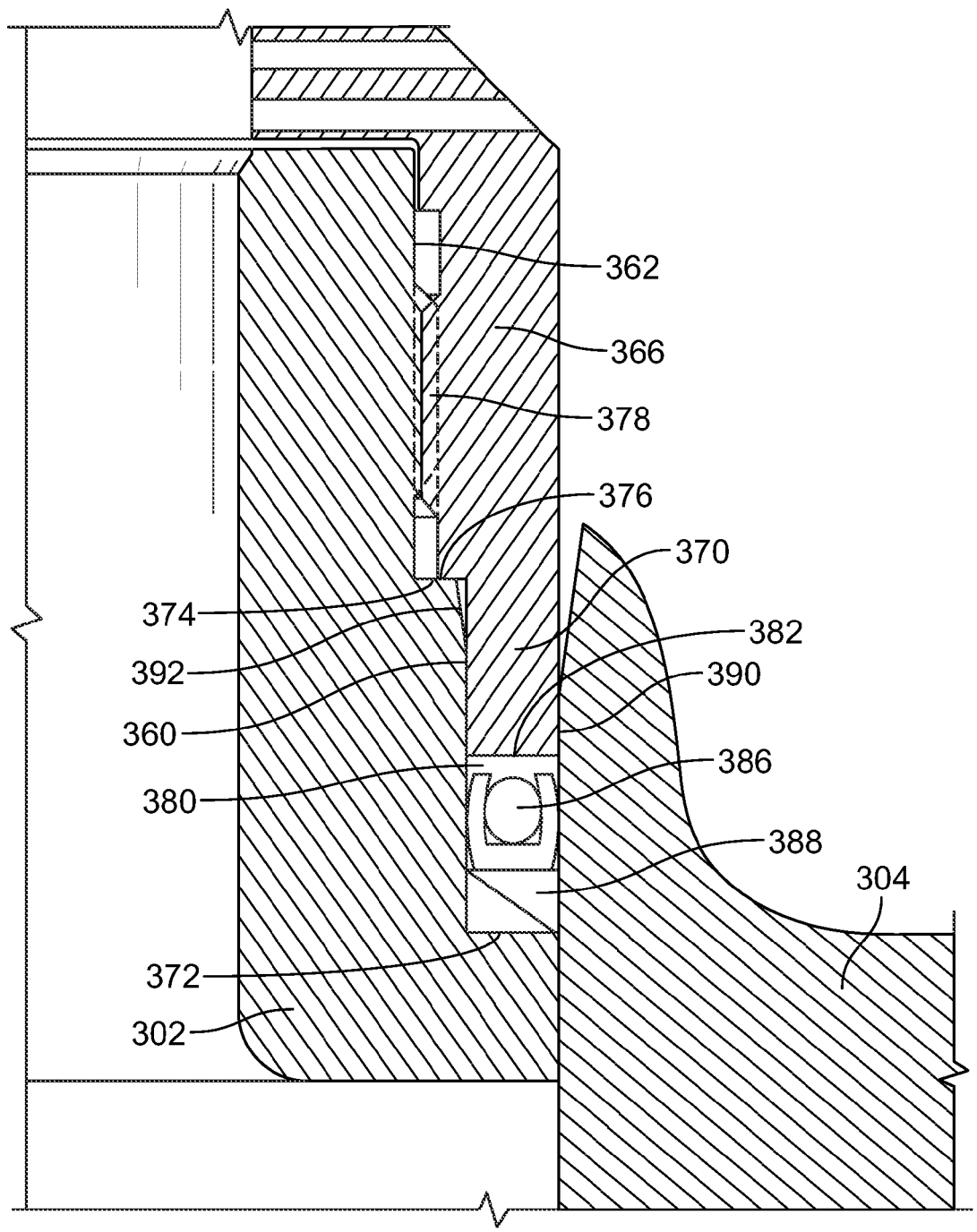
FIG. 3C is a further enlarged view of the example valve seat apparatus of FIGS. 3A and 3B.

FIG. 3A illustrates an example fluid valve 300 implemented with an example valve seat apparatus 302. FIGS. 3B and 3C illustrate enlarged views of the example fluid valve 300 of FIG. 3A. The example fluid valve 300 may receive seal assemblies that may be used in applications having process fluid temperatures between about −325° F. and 1100° F., or higher.

Referring to FIG. 3A, the fluid valve 300 includes a valve body 304 defining a fluid flow pathway 306 between an inlet 308 and an outlet 310. A valve trim assembly 312 interposes in the fluid flow passageway 306 to control the fluid flow between the inlet 308 and the outlet 310. The valve trim assembly 312 includes internal components of the fluid valve 300 such as, for example, a cage 314, a closure member 316 (e.g., a valve plug, a flow control member, a piston), the valve seat 302 and a valve stem 318.

The cage 314 is disposed between the inlet 308 and the outlet 310 to provide certain fluid flow characteristics through the valve body 304 (e.g., reduce noise and/or cavitation generated by the flow of fluid through the fluid valve 300). The cage 314 includes a bore 320 to receive (e.g., slidably receive) the closure member 316 and at least one opening 322 through which fluid can flow when the fluid valve 300 is in an open position (i.e., when the closure member 316 is spaced away from the valve seat 302). The cage 314 can be configured in different manners (e.g., the openings 322 having various shapes, sizes or spacing) to provide particular, desirable fluid flow characteristics such as, for example, to control the flow, reduce noise and/or cavitation, to enhance pressure reductions of the process fluid, etc.

In the illustrated example, the cage 314 is a substantially unitary structure. A first end 324 of the cage 314 includes a flange 326 that engages a surface 328 of the valve body 304. A bonnet (e.g., the bonnet 124 of FIG. 1) engages the flange 326 to retain the cage 314 within the valve body 304. When the cage 314 is coupled to the valve body 304, the cage 314 suspends or retains the valve seat 302 within the valve body 304. Thus, the cage 314 can also facilitate maintenance, removal, and/or replacement of the other components of the valve trim assembly 312.

The cage 314 guides the closure member 316 and provides lateral stability, balance, and alignment as the closure member 316 moves between the open position and a closed position, thereby reducing vibrations and other mechanical stress. The closure member 316 closely fits within the bore 320 and is to slide within the cage 314 between the closed position, in which the closure member 316 obstructs the openings 322 of the cage 314, and the open position, in which the closure member 316 is clear of (i.e., does not block) at least a portion of the openings 322.

In the illustrated example, the closure member 316 is depicted as a valve plug having a cylindrical body 330 and a sealing surface 332. However, in other examples, the closure member 316 may be a disk or any other structure to vary the flow of fluid through the fluid valve 300. The valve stem 318 operatively couples the closure member 316 to an actuator (not shown). In this example, the closure member 316 includes channels or conduits 334 to balance or equalize the forces exerted across the closure member 316 by the pressures of the process fluid acting across the closure member 316. As a result, a smaller actuating force can be provided to move the closure member 316 between the open and closed positions. The closure member 316 also includes a recessed portion 336 to receive a plug seal assembly 338. The plug seal assembly 338 engages an inner surface 340 of the cage 314 to prevent fluid from leaking between the cage 314 and an outer surface 342 of the closure member 316. The plug seal assembly 338 includes a seal member 344 (e.g., an O-ring) composed of an elastomeric material and an anti-extrusion ring 346. In some examples, the anti-extrusion ring 346 prevents the seal member 344 from extruding between the outer surface 342 of the closure member 316 and the inner surface 340 of the cage 314 when the process fluid temperature is between about 450° F. and 600° F. The plug seal assembly 338 may also include a backing ring or retaining ring 348.

As most clearly shown in FIGS. 3B and 3C, the valve seat 302 is a seat ring having an inner surface 350 and an outer surface (e.g., an outer peripheral edge, an outer wall) comprised of three portions (e.g., surfaces, sections, walls, etc.): a first portion 352; a second portion 354; and a third portion 356. In the example shown, the first portion 352 is a flange portion having an outer wall 358 with a first diameter, the second portion 354 is a sealing portion having an outer wall 360 with a second diameter, and the third portion 356 is a coupling portion having an outer wall 362 with a third diameter. In the example shown, the first diameter is greater than the second diameter and the third diameter, and the second diameter is greater than the third diameter, such that the three portions 352, 354, 356 have a step-like profile cross-section. In the example shown, the outer walls 358, 360, 362 of the three portions 358, 360, 362 are substantially parallel to one another. However, in other examples, the outer walls 358, 360, 362 may not be substantially parallel to one another.

The coupling portion 356 is adjacent a first end 364 of the valve seat 302 to receive a portion or second end 366 of the cage 314. The valve seat 302 has a second end 368 opposite the first end 364. As shown, the sealing portion 354 is located between the coupling portion 356 and the flange portion 352 of the valve seat 302. The sealing portion 354 is to receive an extension 370 of the second end 366 of the cage 314. The flange portion 352 has a first step 372 (e.g., a shoulder, a ledge, a lip, a wall, a surface) formed (e.g., via machining) in the outer surface of the valve seat 302 between the flange portion 352 and the sealing portion 354 (e.g., between the outer wall 358 of the flange portion 352 and the outer wall 360 of the sealing portion 354). The sealing portion 354 has a second step 374 formed in the outer surface of the valve seat 302 between the sealing portion 354 and the coupling portion 356 (e.g., between the outer wall 360 of the sealing portion 354 and the outer wall 362 of the coupling portion 356). In the example shown, the first step 372 and the second step 374 are substantially perpendicular to the outer walls 358, 360, 362 of the respective portions 352, 354, 356. In the example shown, the first step 372 and the second step 374 are substantially parallel to one another. However, in other examples, the first step 372 and the second step 374 may be not be substantially parallel. In the example shown, a shoulder 376 (e.g., a ledge, a lip, a wall, a surface) is formed in the cage 314 between the second end 366 of the cage 314 and the extension 370. In this example, the first end 364 of the valve seat 302 is coupled to the second end 366 of the cage 314 via threads 378, which are disposed on the outer wall 362 of the coupling portion 356 and the inside of the cage 314.

When the valve seat 302 is coupled to the cage 314 (e.g., via the threads 378), a cavity 380 (e.g., a gland, an annular gland, a groove, a seal gland, etc.) is defined by the first step 372 of the valve seat 302, a bottom surface 382 (e.g., edge) of the extension 370, and the outer wall 360 of the sealing portion 354. A seal or seal assembly 384 (e.g., a first seal assembly) is disposed within the cavity 380. As shown in this example, the seal assembly 384 includes a seal 386 (e.g., an omni-seal, an o-ring, etc.) and anti-extrusion rings 388. The seal 386 may be composed of an elastomeric or fluoropolymer such as, for example PTFE. The anti-extrusion ring 388 (e.g., a hard plastic ring) provides additional sealing to prevent the seal 386 from extruding between the valve seat 302 and the valve body 304 when the fluid valve 300 is used with process fluids having temperatures between about 450° F. and 600° F. In some examples, for process fluids having temperatures less than about 450° F., the anti-extrusion ring 388 may not be used. As shown, the anti-extrusion ring 388 is disposed between the first step 372 and the seal 386, and the seal 386 is disposed between the anti-extrusion ring 388 and the bottom surface 382 of the extension 370. The seal assembly 384 engages a surface 390 (FIG. 3C) of the valve body 304 when the valve seat 302 (and the cage 314) is coupled to the valve body 304. In the example shown, a portion of the surface 390 of the valve body 304 may be tapered to provide a smooth transition and reduce sharp edges for assembling the cage 314 and valve seat 302.

As illustrated more clearly in FIG. 3C, the valve seat 302 also includes a tapered edge 392 between the outer wall 360 and the second step 374 of the sealing portion 354. In the example shown, the tapered edge 392 provides a lead-in angle to facilitate assembly of the seal assembly 384. In some examples, during assembly of the valve seat 302, the anti-extrusion ring 388 and the seal 386 are slid over the tapered edge 392 and onto the sealing portion 354 of the valve seat 302. The valve seat 302 may then be coupled (e.g., via the threads 378) to the second end 366 of the cage 314. As the valve seat 302 is threaded onto the cage 314, the extension 370 of the cage 314 slidably engages the outer wall 360 of the sealing portion 354. In the example shown, the valve seat 302 is screwed into the cage 314 until the second step 374 of the valve seat 302 engages the shoulder 376 of the cage 314. Therefore, the width (e.g., the length) of the cavity 380 may be controlled by the placement of the second step 374 in the valve seat 302 and the shoulder 376 in the cage 314. Thus, the placement of these two surfaces may be used to control the width of the cavity 380.

In operation, an actuator (e.g., a pneumatic actuator) moves the valve stem 318 and, thus, the closure member 316 between the closed position at which the closure member 316 is in sealing engagement with the valve seat 302 to restrict or prevent fluid flow through the fluid valve 300 and the fully open or maximum flow rate position at which the closure member 316 is spaced away from the valve seat 302 and the openings 322 of the cage 314 to allow fluid flow through the fluid valve 300. In the open position, fluid flows between the inlet 308, through the openings 322 of the cage and through the outlet 310. In the closed position, the closure member 316 obstructs the openings 322 of the cage 314 and the sealing surface 332 sealingly engages the valve seat 302 to prevent fluid flow between the inlet 308 and the outlet 310.

The seal assembly 384 provides a seal between the valve body 304 and the valve seat 302. Leakage between the valve body 304 and the valve seat 302 (and between the closure member 316 and the cage 314) may affect the shut-off classification of the fluid valve 300. The seal assembly 384 is disposed between the valve seat 302 and the valve body 304 to prevent leakage between the inlet 308 and the outlet 310 of the fluid valve 300 when the closure member 316 is in the closed position to improve the shut-off classification of the fluid valve 300.

Figure 4:
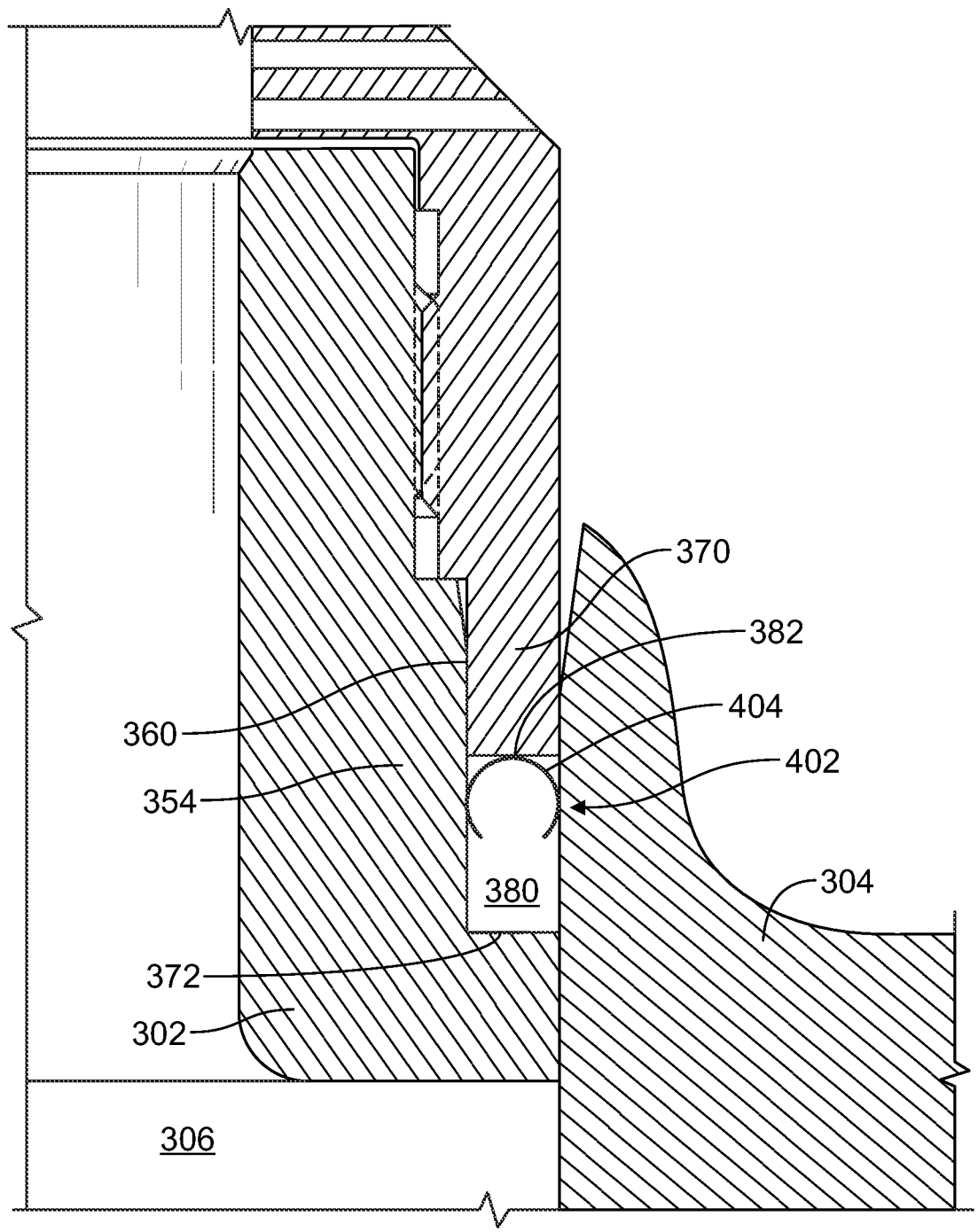
FIG. 4 illustrates an enlarged view of the example valve seat apparatus of FIG. 3A with an alternative seal assembly described herein.

FIG. 4 illustrates the valve seat 302 of FIGS. 3A-3C having another example seal assembly 402 (e.g., a second seal assembly). As shown, the cavity 380 is defined by the first step 372 of the valve seat 302, the bottom surface 382 of the extension 370 and the outer wall 360 sealing portion 354. The seal assembly 402 is disposed within the cavity 380 of the valve seat 302. In this example, the seal assembly 402 includes a bore seal 404 (e.g., a C-shaped seal) that is made of metal or any other material that is highly resistant to temperatures greater than about 600° F. The bore seal 404 can resist such high temperatures and provides a seal between the valve seat 302 and the valve body 304. Depending on the flow direction of the fluid flowing through the passageway 306, the bore seal 404 may be disposed within the cavity 380 with an opening of the bore seal 404 facing the direction of the fluid flow.

The example valve seat 302 described herein provides modular valve seats that accommodate or receive a first seal assembly (e.g., the seal 386 and the anti-extrusion ring 388) for use with process fluids having a first temperature range (e.g., between about −100° F. or lower and 600° F.) that is interchangeable with a second seal assembly (e.g., the seal 404) for use with process fluids having a second temperature range (e.g., between about 600° F. and 1100° F., or higher). As a result, the example valve seat apparatus described herein significantly reduces manufacturing costs and inventory costs associated with, for example, the fluid valves 100 and 200 of FIGS. 1 and 2, respectively. Thus, the example valve seat apparatus described herein enables different seal assemblies to be used with the same valve seat/body configuration.

Although only a few types of seals are described herein, the example valve seat 302 is capable of receiving other seals and seal assembly components including flexible seals and non-flexible seals (e.g., stiff seals) such as, for example, omni-seals, spring-loaded seals, seat ring-to-body web seals, c-seals, cryogenic seals, anti-extrusion rings, flat gaskets, backing rings, etc. For example, the valve seat 302 may accommodate a cryogenic seal (e.g., a stiff seal) for use in process fluids having a temperature range about −350 and −100° F. The example valve seat apparatus disclosed herein enables different types of seals and/or seal assemblies to be dropped into the seal gland.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. An apparatus, comprising:
   a cage to be disposed in a fluid valve, an end of the cage having an extension, an inner wall of the cage at the end having a first inner diameter and an inner wall of the extension having a second inner diameter greater than the first inner diameter;
   a seat ring to be coupled to the cage, the seat ring having a central passage therethrough and an outer wall, the outer wall comprising:
      a threaded portion to engage the cage, the threaded portion having a first outer diameter, the first outer diameter substantially the same as the first inner diameter;
      a sealing portion to capture a seal assembly between the sealing portion and a surface of a body of the fluid valve, the sealing portion having a second outer diameter greater than the first outer diameter, the second outer diameter substantially the same as the second inner diameter; and
      a flange portion to capture the seal assembly between the cage and the flange portion, the flange portion to extend toward the surface of the body and the sealing portion to be positioned between the flange portion and the threaded portion, the flange portion having a third outer diameter greater than the second outer diameter.

2. The apparatus as defined in claim 1, wherein the seal assembly comprises one or more of a cryogenic seal, a polytetrafluoroethylene seal, an anti-extrusion ring, an omni-seal, a flat gasket, a spring-loaded seal or a c-seal.

3. The apparatus as defined in claim 1, wherein the threaded portion of the seat ring is to be threadably coupled to the inner wall of the cage at the end of the cage.

4. The apparatus as defined in claim 1, wherein the inner wall of the extension is substantially parallel to the sealing portion of the outer wall of the seat ring when the seat ring is coupled to the cage.

5. The apparatus as defined in claim 1, wherein the seat ring comprises a first step in the outer wall between the flange portion and the sealing portion and a second step in the outer wall between the sealing portion and the threaded portion.

6. The apparatus as defined in claim 5, wherein an annular gland is defined by the first step, the sealing portion and a bottom surface of the extension of the cage when the seat ring is coupled to the cage.

7. The apparatus as defined in claim 1, wherein the sealing portion is to receive a first seal assembly interchangeable with a second seal assembly different from the first seal assembly.

8. The apparatus as defined in claim 7, wherein the first seal assembly comprises a polytetrafluoroethylene seal for use with process fluids having temperatures between about $-100°$ F. and $450°$ F.

9. The apparatus as defined in claim 7, wherein the first seal assembly comprises a polytetrafluoroethylene seal and an anti-extrusion ring for use with process fluids having temperatures between about $450°$ F. and $600°$ F.

10. The apparatus as defined in claim 7, wherein the first seal assembly is further interchangeable with a third seal assembly, the third seal assembly for use with process fluids having temperatures greater than about $-325°$ F.

11. The apparatus as defined in claim 7, wherein the first seal assembly comprises a polytetrafluoroethylene seal.

12. The apparatus as defined in claim 11, wherein the second seal assembly comprises a metal seal.

13. The apparatus as defined in claim 12, wherein the metal seal is to be used with a process fluid having a temperature greater than about $600°$ F.

14. The apparatus as defined in claim 7, wherein the first seal assembly is for use with process fluids having temperatures less than about $600°$ F. and the second seal assembly is for use with process fluids having temperatures greater than about $600°$ F.

15. The apparatus as defined in claim 14, wherein the second seal assembly comprises a bore seal.

16. The apparatus as defined in claim 15, wherein the bore seal comprises a metal seal having a C-shaped cross-section.

17. An apparatus comprising:
a cage to be disposed in a fluid valve, the cage including a main portion and an extension extending from the main portion, an inner wall of the main portion having a first inner diameter and an inner wall of the extension having a second inner diameter greater than the first inner diameter, the cage including a shoulder between the main portion and the extension; and
a seat ring to be coupled to the cage, the seat ring having a central passage therethrough and an outer wall, the outer wall comprising:
a threaded portion to engage the cage, the threaded portion having a first outer diameter;
a sealing portion to capture a seal assembly between the sealing portion and a surface of a body of the fluid valve, the sealing portion having a second outer diameter greater than the first outer diameter;
a flange portion to capture the seal assembly between the cage and the flange portion, the flange portion to extend toward the surface of the body and the sealing portion to be positioned between the flange portion and the threaded portion, the flange portion having a third outer diameter greater than the second outer diameter;
a first step between the flange portion and the sealing portion; and
a second step between the sealing portion and the threaded portion, the shoulder of the cage to engage the second step when the seat ring is coupled to the cage.

18. The apparatus as defined in claim 17, wherein when the shoulder is engaged with the second step of the seat ring, the inner wall of the extension is engaged with sealing portion of the seat ring.

19. An apparatus comprising:
a cage to be disposed in a fluid valve, an end of the cage having an extension, an inner wall of the cage at the end having a first inner diameter and an inner wall of the extension having a second inner diameter greater than the first inner diameter; and
a seat ring to be coupled to the cage, the seat ring having a central passage therethrough and an outer wall, the outer wall comprising:
a threaded portion to engage the cage, the threaded portion having a first outer diameter;
a sealing portion to capture a seal assembly between the sealing portion and a surface of a body of the fluid valve, the sealing portion having a second outer diameter greater than the first outer diameter;
a flange portion to capture the seal assembly between the cage and the flange portion, the flange portion to extend toward the surface of the body and the sealing portion to be positioned between the flange portion and the threaded portion, the flange portion having a third outer diameter greater than the second outer diameter;
a first step between the flange portion and the sealing portion; and
a second step between the sealing portion and the threaded portion, the sealing portion being tapered adjacent the second step.

* * * * *